United States Patent
Allen et al.

(10) Patent No.: US 7,720,098 B1
(45) Date of Patent: May 18, 2010

(54) WIRELESS BANDWIDTH AGGREGATION

(75) Inventors: Todd W. Allen, Duvall, WA (US); Kevin W. Jones, St. Louis Park, MN (US)

(73) Assignee: AT&T Mobility II LLC, Atlanta, GA (US)

(*) Notice: Subject to any disclaimer, the term of this patent is extended or adjusted under 35 U.S.C. 154(b) by 186 days.

(21) Appl. No.: 11/835,712

(22) Filed: Aug. 8, 2007

(51) Int. Cl.
    *H04J 3/16* (2006.01)
(52) U.S. Cl. .................. 370/468; 370/464; 370/465
(58) Field of Classification Search ............... 370/468, 370/328, 464, 465
    See application file for complete search history.

(56) References Cited

U.S. PATENT DOCUMENTS

| 5,796,727 | A  | * | 8/1998  | Harrison et al. | 370/338 |
|-----------|----|---|---------|-----------------|---------|
| 6,754,196 | B1 | * | 6/2004  | Daane et al.    | 370/338 |
| 7,092,402 | B1 | * | 8/2006  | Smith et al.    | 370/437 |
| 7,453,844 | B1 | * | 11/2008 | Lee et al.      | 370/329 |
| 2004/0170191 | A1 | * | 9/2004  | Guo et al.   | 370/330 |
| 2004/0208150 | A1 | * | 10/2004 | Chang et al. | 370/338 |
| 2004/0233930 | A1 | * | 11/2004 | Colby, Jr.   | 370/464 |
| 2005/0105509 | A1 | * | 5/2005  | Crocker et al. | 370/352 |
| 2005/0254460 | A1 | * | 11/2005 | Fraser et al. | 370/328 |
| 2006/0067270 | A1 | * | 3/2006  | Gilliland et al. | 370/329 |
| 2007/0047485 | A1 | * | 3/2007  | Gorokhov et al. | 370/329 |
| 2007/0115951 | A1 | * | 5/2007  | Karaoguz et al. | 370/356 |
| 2007/0140169 | A1 | * | 6/2007  | Rajagopalan   | 370/331 |
| 2007/0237082 | A1 | * | 10/2007 | Han           | 370/235 |
| 2008/0008188 | A1 | * | 1/2008  | Buga et al.   | 370/395.21 |
| 2008/0043648 | A1 | * | 2/2008  | Buga et al.   | 370/310 |
| 2008/0080412 | A1 | * | 4/2008  | Cole et al.   | 370/328 |
| 2008/0165701 | A1 | * | 7/2008  | Ananthanarayanan et al. | 370/254 |
| 2008/0240130 | A1 | * | 10/2008 | Oved          | 370/401 |
| 2009/0046740 | A1 | * | 2/2009  | Ruckart       | 370/468 |
| 2009/0111378 | A1 | * | 4/2009  | Sheynman et al. | 455/41.1 |

* cited by examiner

*Primary Examiner*—Chi H Pham
*Assistant Examiner*—Robert Lopata
(74) *Attorney, Agent, or Firm*—Woodcock Washburn LLP (57) ABSTRACT

Methods and apparatus are disclosed for dynamic bandwidth expansion for wireless clients of a wireless wide-area network (WWAN), wherein each client has an allocated bandwidth for communicating over the WWAN and the clients are within wireless signal reception of each other. The WWAN clients may voluntarily or in a predetermined manner join a pool of bandwidth-sharing clients. A wireless aggregation server and a wireless pool boss work in cooperation to utilize unused transmit and receive bandwidth from each of the pool members.

20 Claims, 7 Drawing Sheets

FIG. 1

WAM Deployment Example

FIG. 6
Outbound Data Flow
Method

FIG. 7

Inbound Data Flow Method

WIRELESS BANDWIDTH AGGREGATION

FIELD OF THE INVENTION

The embodiments described herein relate to wireless wide-area networks (WWAN), and more particularly, to adjustable bandwidths within a WWAN.

BACKGROUND OF THE INVENTION

The users of a WWAN system are typically assigned individual bandwidths for communicating with the network; however, much of the individually owned bandwidths are often wasted, as nearly all users do not utilize their bandwidths at full capacity. In the past, to make efficient use of bandwidths, the users of low speed wireline modems have linked banks of modems to create a single higher bandwidth connection, where each wireline modem had a fixed bandwidth constantly available to it due to the PSTN (Public Switched Telephone Network) connection. The number of modems was constrained by the number of available PSTN connections. Others experimented with binding multiple wireless data connections within a single device (e.g., binding multiple Enhanced Data Rate Global Evolution (EDGE) radios within a single Wireless Wide Area Network (WWAN) router/gateway) to achieve a similar result.

Currently, even when WWAN users operate in close physical proximity and are within signal reception of each other, such as in an office, a coffee shop, or on an airplane, their unused bandwidths are being wasted and are unavailable to a nearby user in need of extra bandwidth.

SUMMARY OF THE INVENTION

In one aspect, a wireless aggregation for mobility (WAM) system can be used as a portable hotspot by aggregating the bandwidth allocation of all the WAM system members. Each member adds itself to the WAM system to form a WAM object community that can more effectively utilize the combined bandwidth of all of its members. Each WAM participant can utilize not only its own allocated bandwidth but also the unused bandwidth acquired from other WAM participants in the WAM object community.

DETAILED DESCRIPTION OF ILLUSTRATIVE EMBODIMENTS

System Overview

The following disclosed embodiments relate, in general, to communication management of wireless wide-area networks (WWAN), and more particularly, to providing dynamically expandable bandwidths by voluntarily forming controlled local-area network (LAN) communication among multiple WWAN users. For example, in the case of close physical proximity, wireless users of a WWAN service agree to join and form a local area network (LAN) and share their assigned bandwidths. One feature of such "wireless aggregation for mobility" (WAM) is that one or more peer members of the formed group can manage the bandwidth sharing processes, thereby providing high-speed data access.

(Note that the group members need not necessarily be "mobile" and could include fixed or wireless applications.)

The WAM technology provides an array of benefits to a variety of constituencies, including individual users, enterprises, and wireless carriers. With regard to individuals, data users constantly desire more bandwidth. WiFi hotspots have helped to partly solve this problem, but WiFi hotspots become congested and degrade the performance. "WiFi" or Wireless Fidelity is a popular term for a high-frequency wireless local area networking under the I.E.E.E. 802.11 protocols. In addition, the hotspot operators lack uniformity and interoperability. Therefore, WiFi hotspots are still far from pervasive. WAM allows groups of users to create their own hotspots, anywhere, anytime, requiring only that each user has a WAM client and a wireless WAN (WWAN) connection.

The WAM client is software that resides on the device such as a laptop computer, tablet computer, handheld computing device, or machine to machine communications device. Depending upon the processor speed and available memory, devices may or may not be capable of supporting the WAM client. Typical laptop and tablet computers support the WAM software client. Support on handheld devices and machine to machine devices will be dependent upon operating system, available memory, and processing power. Typical hardware supporting a WAM client are a computing device such as a laptop or PDA, a WWAN radio, and a WLAN radio. Wireless PDAs typically include both of these radio interfaces. Many laptops built today also include both radio interfaces. For laptops that do not include these interfaces, they may be added through the use of PCMCIA cards. Most laptops and tablet PCs could serve as a WAM client. Handheld devices that support a full operating system, such as Windows Mobile, could also be used as clients.

Business enterprises incur significant expenses to provide terrestrial data connectivity to remote offices. In many of these offices, especially those with mobile workers, connections are idle much of the time and the enterprise incurs expenses for out of office connectivity, such as for WWAN or dialup. WAM allows each enterprise to eliminate the terrestrial network expenses by utilizing the WWAN connectivity already used by the mobile users while out of the office.

With regard to wireless carriers, the number of channels required and the amount of spectrum consumed per user is the same regardless of whether the users share their bandwidths or not. By binding the users together, the opportunity for optimization and load balancing exists and can result in more efficient use of the valuable spectrum. WAM provides wireless carriers with a way to compete with WiFi hotspots by giving the users the flexibility to forego traveling to a fixed hotspot location and, instead, to create their own virtual hotspot wherever they are.

The WAM techniques can be employed with any wireless technology such as cellular, wireless LAN, or short-range radio frequency (RF). A variety of other applications and extensions of the technology beyond those described herein are both possible. Extensions include inter-community roaming.

Various embodiments of the invention are described herein. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

System Application

Wireless bandwidth aggregation (e.g., "WAM") involves the binding of multiple wireless wide-area network connections on separate wireless devices to create a dynamic bandwidth to be shared by all the bound devices. An expandable throughput is achieved by using a pool of candidates. This technology allows the WWAN users, who subscribe to a WAM pool, to utilize the excess wireless bandwidth capacity of other users in the pool, while each individual user has access to his/her entire bandwidth at any time. For example, broadband wireless throughput speeds can be achieved by binding together several 100 Kbps WWAN connections.

On a cellular WWAN network, an individual connection provides a user with a certain amount of bandwidth, where the exact amount is a function of the type of network (e.g., General Packet Radio Service (GPRS), Enhanced Data Rates for Global Evolution (EDGE), 1X Radio Transmission Technology (1xRTT), Evolution Data Only (EVDO), WiMax or Universal Mobile Telecommunication System (UMTS)) and the signal strength at the mobile station, among other factors. For example, on an EDGE network, an individual user can have access to 100 Kbps to 130 Kbps of bandwidth. The size of the bandwidth pool can change dynamically as subscribers vary the use of their 100 Kbps connection. The size of the bandwidth pool can also change dynamically as subscribers enter or exit the pool. WAM allows multiple users to voluntarily join a community of users in which all members of the community allow their bandwidth to be bound together into a shared bandwidth pool. All users demanding bandwidth at any moment may share the bandwidth of the pool.

A WAM pool or community might be formed by a collection of individuals in a coffee shop or airport who establish a WWAN connection and enable their WAM clients. The WAM client configures a WiFi, Bluetooth or other local or personal area network technology connection for peer-to-peer communication and signals to others in the area that the user is willing and available to join a WAM community. If another WAM user or existing WAM pool is detected, a connection may be established. This variant of WAM facilitates the formation of dynamic hotspots by otherwise unaffiliated users. It may be thought of as an open WAM community where the community members may form their own hotspots.

Because the bandwidth usage by any one user is rarely continuous (e.g., when browsing the web, a user will often spend more time reading the web pages than loading them), most of the time most of the users will have surplus bandwidths that can be made available to other users. The result is that each user in a WAM community has an effective bandwidth which is greater than the user could have individually, outside the community. In one embodiment, WWAN connections assigned to a group of subscribers are voluntarily bound together so that their excess capacity is used to create a bandwidth "pool" that can be used by any member of the subscriber group. In another embodiment joining the pool or the bandwidth usage priority may not be voluntary, rather a condition of the WWAN access. However, every user has access to his/her entire bandwidth at any time the user needs to utilize his/her entire bandwidth. The size of the bandwidth pool changes dynamically as subscribers vary the use of their allotted bandwidth, or as they enter or exit the pool.

For example, in one embodiment there may be 10 wireless service subscribers each with 100 Kbps assigned communication channel. These 10 low bandwidth connections are bound together to create a 'pooled' connection with a maximum aggregate capacity of about 1 Mbps. In this arrangement each subscriber always has access to his/her 100 Kbps channel but any unused portion of his/her 100 Kbps is in the pool and available for use by any of the other bound subscribers. In a similar, higher-speed example, multiple broadband wireless users (a combination of W-CDMA, WiMax, WiFi, CDMA2000) pool their collective bandwidth availability to create an aggregate WAN bandwidth of many megabytes.

Secure communications using a WAM system is accommodated by encrypting transmissions in some WAM communities. For example, in a closed corporate WAM community, security is less of a concern because all users in the community are employees of the enterprise. However, in a WAM community serving multiple different business enterprises, secure communications are preferred to maintain security between transmissions of different business enterprises. In an open public WAM community, encryption is preferred to maintain privacy between transmissions of different individuals or users. To assure optimal security and performance, the WAM traffic can be encrypted using a VPN or other similar encryption technology that is well known in the art. Since the participating WAM clients don't open the transmission packets, but rather simply route them to and from their destinations, encryption is essentially transparent to WAM community and operations.

Figure 1:
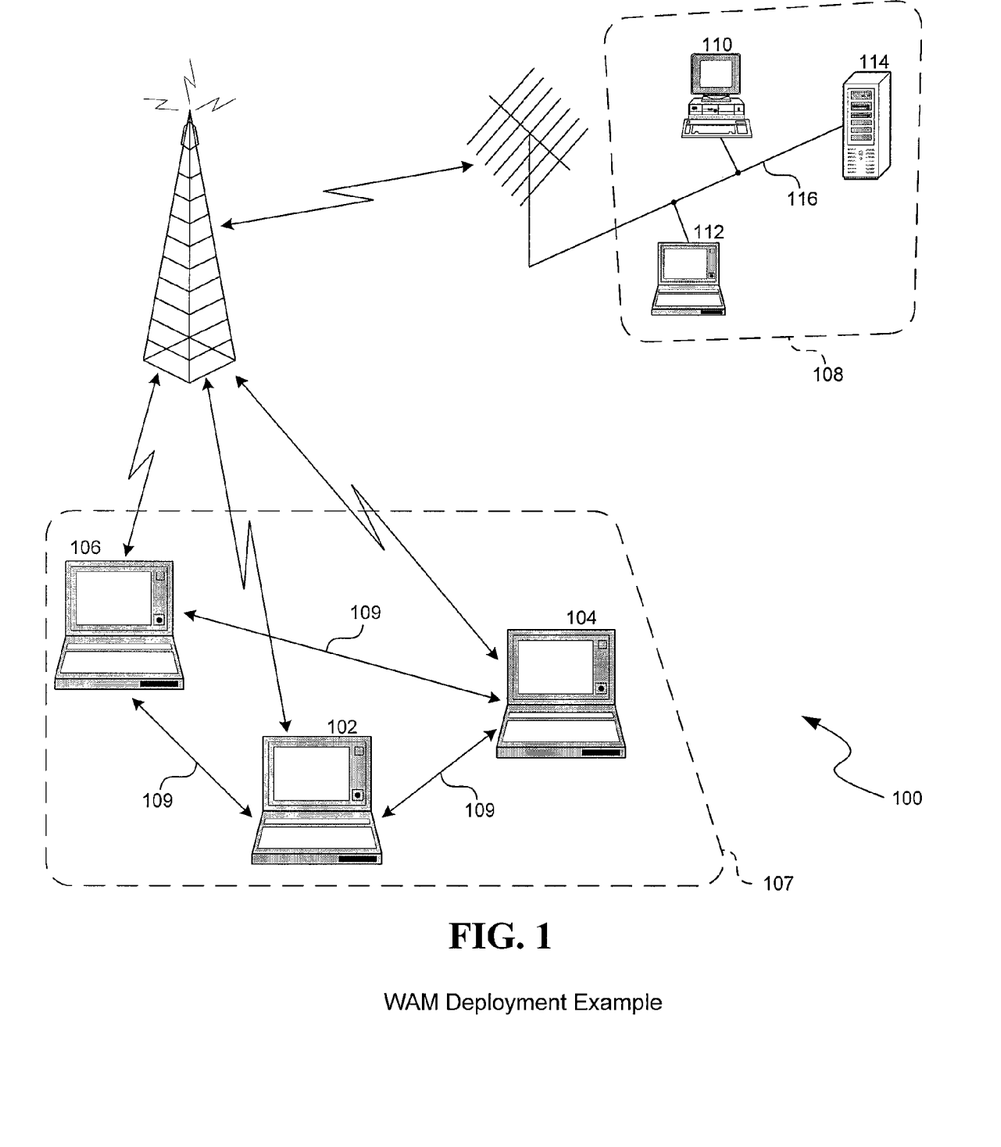
FIG. 1 depicts a wireless aggregation for mobility (WAM) deployment example.

FIG. 1 shows an example of high level deployment options for a wireless aggregation for mobility (WAM) system 100 by depicting three WWAN (wireless wide-area network) clients 102, 104, and 106 forming one bandwidth-sharing pool 107. The clients 102, 104, and 106 exchange communications over an appropriate wired or wireless link 109, to assist in the bandwidth-sharing described herein. Pool members may be connected via any combination of wired, fiber and/or wireless infrastructures (i.e. such as LAN/MAN/WAN, WiFi, infrared, Bluetooth, Ultrawideband, WiMax, etc.), in ad-hoc, peer-to-peer, and access point (control point) configurations. In FIG. 1, the WWAN 100 also comprises another LAN pool 108 formed by the WWAN clients 110, 112, and 114 which may share each other's unused bandwidths over a wired LAN 116.

The utilization of pooled resources is partly based on the notions of a "payload" network, a "control" network, and an "egress" network. The payload network is the actual aggregation of bandwidth available from each pool member. The control network, on the other hand, provides for the interaction of network resources for "payload" delivery and reception between pool members and a master (or masters). The control network also provides for the backplane transit of payload traffic to and/or from the requesting pool member and the delivery pool member.

Management of the Bandwidth Pool

Figure 2:
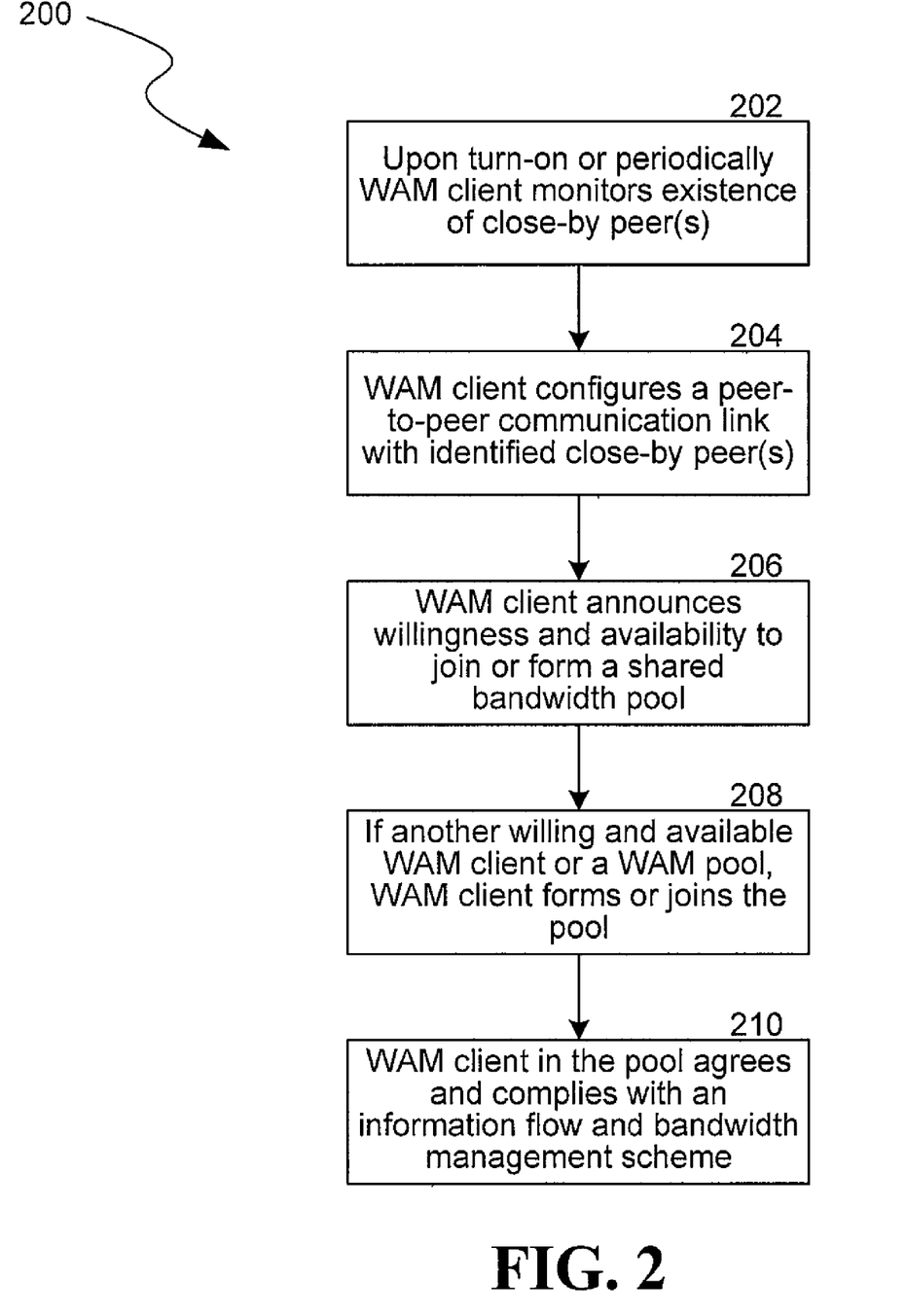
FIG. 2 depicts a typical example method to join a WAM pool.

FIG. 2 depicts a flow diagram 200 of a process of a WAM client forming a WAM pool with another WAM client or joining in an already established WAM pool, in accordance with an embodiment of the invention. In step 202, upon turn-on or periodically, a WAM client monitors received signals to determine the existence of any close-by WAM client (peer).

In step 204, in case of the existence of another client(s), the WAM client configures and establishes a local communication connection for peer-to-peer communication with other peers. In step 206 the WAM client announces its willingness and availability to form or join a WAM client pool to share bandwidth. In step 208 the WAM client forms or joins a client pool and sets up or expands a dynamic hotspot, respectively. In step 210 the pool members agree on a communication management scheme to control the information traffic and to assign communication tasks to client members.

The WAM protocol for participant object exchange information maintains an inventory of active participants and available pooled bandwidth. This is provided to a WAM boss (master) as well as to the pool members (participants). Participants can allow bandwidth reservation in order to support applications requiring class and quality of service guarantees. This can be policy-based by role of the participant. In addition, bandwidth reservation can be allowed for all of their contributory bandwidth or a set percentage or amount. All pool member communication takes place via User Diagram Protocol (UDP) and is ad-hoc (as required) unless a global synchronization is requested by a master or WAM boss unit.

Figure 3A:
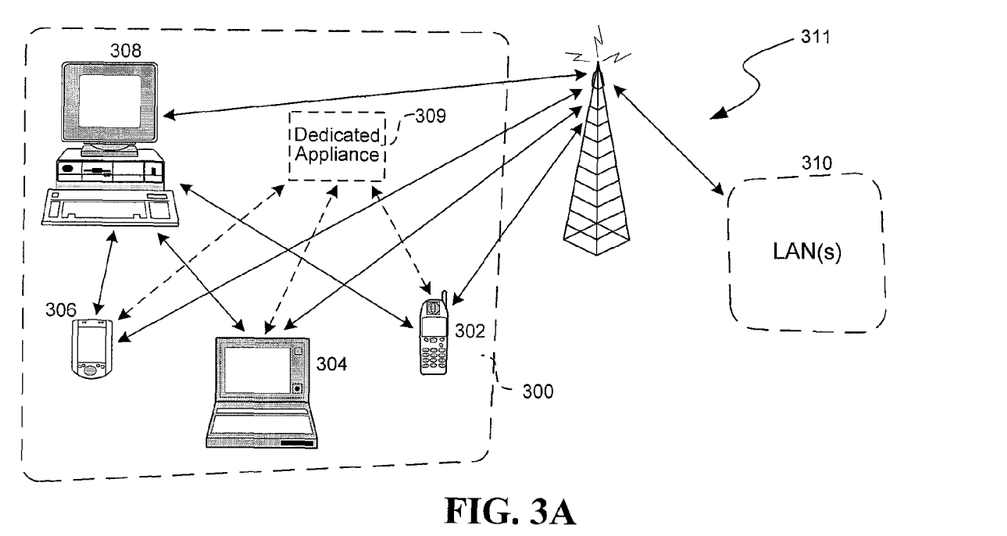
FIG. 3A illustrates a WAM arrangement wherein a single WWAN client or a dedicated appliance manages communications of pool member clients.

In a first method for managing aggregated resources, a master or WAM boss unit (WAMBO) is chosen from among the pool members. The master manages all requests across the control network and then determines which pool members have resources to satisfy the aggregation request. In an alternative embodiment the master is a dedicated appliance. FIG. 3A depicts a WWAN client pool 300 in which a single WWAN client 308 or alternatively a dedicated appliance 309 (WAMBO) is the master and manages the communications of pool members 302-308 with a WWAN 311. The WWAN 311 may include other WWAN clients and other LAN(s) 310.

The WAMBO (client 308 or appliance 309) effectively acts as a routing control unit, breaking up the outbound requests of each pool member client into elements for submission into the network. Therefore, requests from the master to various pool members 302-306 for helping with a transaction determine how network traffic ingresses to the wireless wide-area network. For in-bound traffic, the participating pool members send all traffic, which they have received from the wireless wide-area network, to the master for subsequent reassembly and delivery to the appropriate pool member recipient. In one embodiment, a highest ranking MAC (Medium Access Control), or other unique identifiers, will assume the role of master in the event of a master retirement/decommission.

In a second method for managing aggregated resources, every pool member is a fully recognized peer and, as such, all peers know all other peers. In this method all peers track utilization of other peers and may be responsible for the multiplexing of their requests to multiple pool members. In different embodiments implementing this method the pool members agree on their roles and the distribution of the responsibilities. For example the pool members may take turns for servicing the incoming requests for network transactions or may assign certain responsibilities to specific pool members based on their capabilities, processing speeds, availabilities, etc. In this case, there is no master per se because the responsibility of being a master (WAMBO) is rotated between pool members (WAM participants).

Figure 3B:
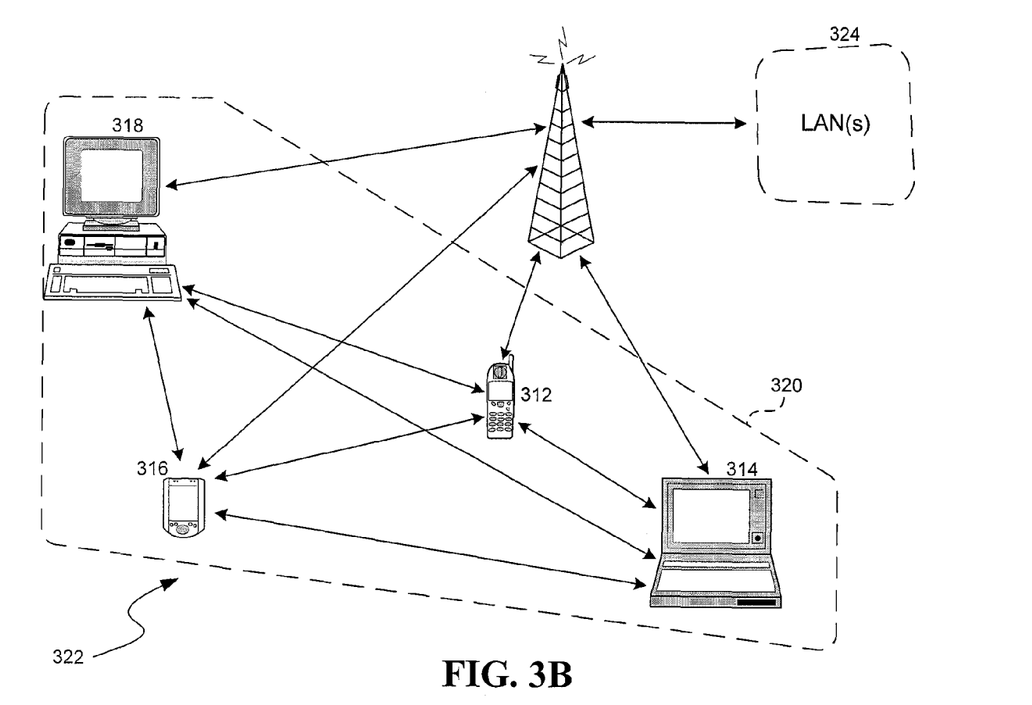
FIG. 3B illustrates a WAM arrangement wherein all pool member clients participate in managing communications of pool member clients.

In the second method, for example, the pool members will accept return path traffic and route them to the appropriate originating pool member who will then reassemble the pieces, arrived from multiple pool peers, into a usable network (TCP/IP or UDP/IP) stream. FIG. 3B depicts a WWAN client pool 320 in which all WWAN clients 312-318 participate in managing the communications of pool members 312-318 with a WWAN 322. The WWAN 322 may include other arrangements of WWAN clients and other LAN(s) 324.

In a third method, alternatively, a sub-group of the pool members may take on the role of a master. In this arrangement the management group members, acting as the master, agrees on their roles and the distribution of the responsibilities. For example the management group members may take turns for servicing the incoming requests or may divide the pool members among themselves and each management group member serve a subset of the pool members exclusively or conditionally. Many arrangements similar to the ones described in the first, the second, and the third method are possible such as by combining aspects of these three methods. One of the advantages of these arrangements is that as WAM clients join and leave a pool, control of the information flow and bandwidth assignment and usage are dynamically managed and in some embodiments are agreed upon and executed by the pool members.

Architecture Examples

WAM supports all standard networking protocols, such as transmission control protocol (TCP) and user datagram protocol (UDP). WAM technology introduces the notion of a virtual backbone and virtual service provider edge; manifested through the presence of two or more networking peers. Each bandwidth aggregation community may be referred to as a WAM object (WAMO). Each WAMO participant may be referred to as a WAMMER. A WAMMER may belong to more than one WAMO at a time, depending entirely on the WAMMER resources which include his network bandwidth and processing capabilities.

Figure 4:
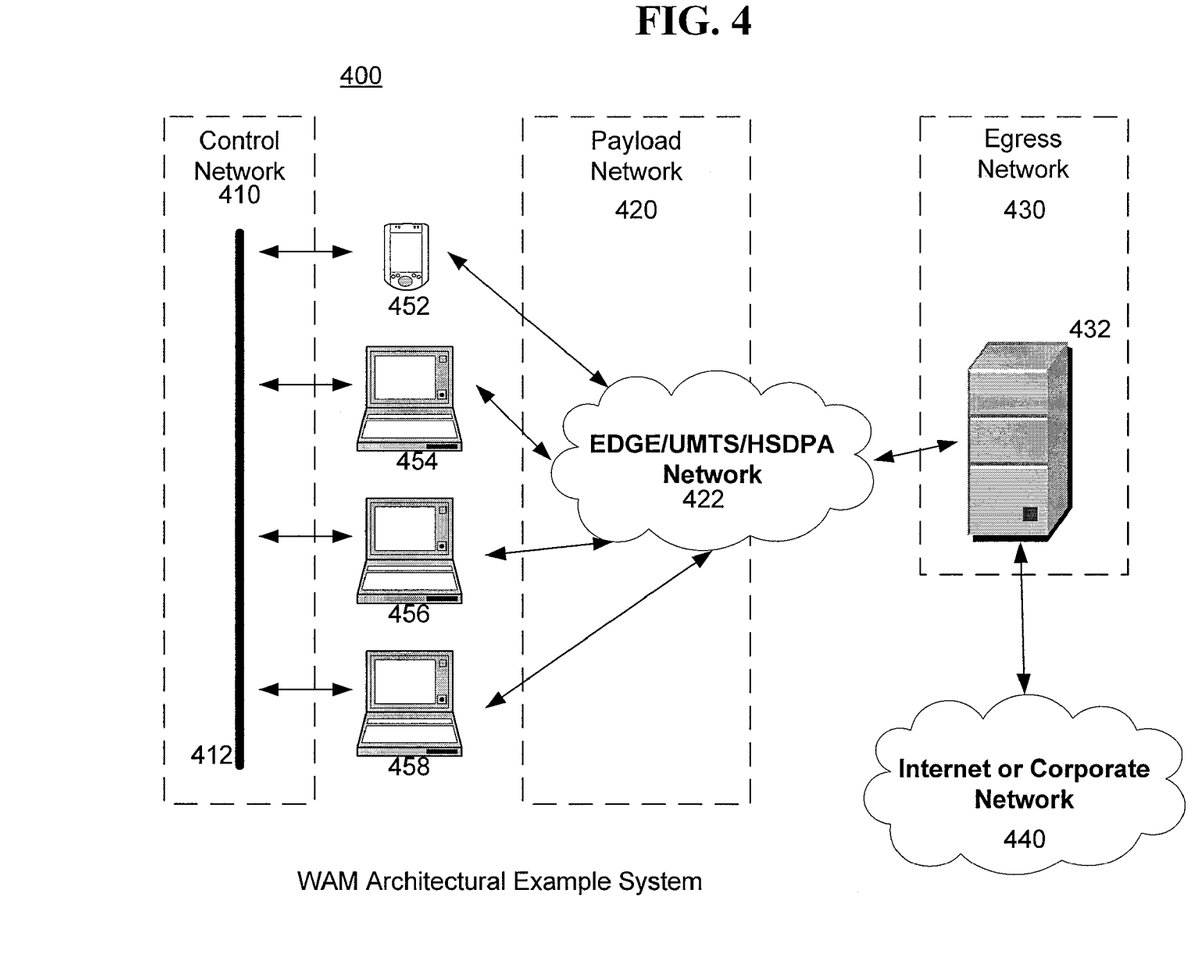
FIG. 4 depicts an architecture for a WAM system.

A WAMO is an aggregation community and is supported by a WAMO system that includes a control network (CTLNET), a payload network (PAYNET), and a egress network (ERGNET). FIG. 4 depicts an example WAM architectural system 400 that includes a control network 410, a payload network 420, and an egress network 430. In one example embodiment, users of the system 400 (computing devices 452, 454, 456, and 458) connect to both the control network 410 and the payload network which can include a network 422 that includes Enhanced Data Rates for Global Evolution (EDGE), Universal Mobile Telecommunication System (UMTS), and High Speed Downlink Packet Access (HSDPA) technologies and the like. The EGDE/UTMS/HSDPA network interfaces with the egress network 430, which may include a WAM pool server 432. The server 432 then connects to an internal corporate network or the Internet 440.

The control network (CTLNET) is responsible for transporting network control information and backbone traffic between WAM participants (i.e. WAMMERs). The control network is generally a LAN architecture, although the control network may also be implemented via a PAN or even a WAN. The control network generally provides a combined bandwidth that is greater than the aggregate of the payload network. The control network is generally homogeneous among all WAM participants. Implementation of the control network may include network types such as WiFi, Ethernet, BlueTooth, UWB, and the like.

The control network is used to route all aggregation data from the payload network between WAMMERs. It operates in this capacity as a backbone network. In this context, WAMMERs are considered to be network edge components that send and receive information via the payload network to a destination egress.

Figure 5:
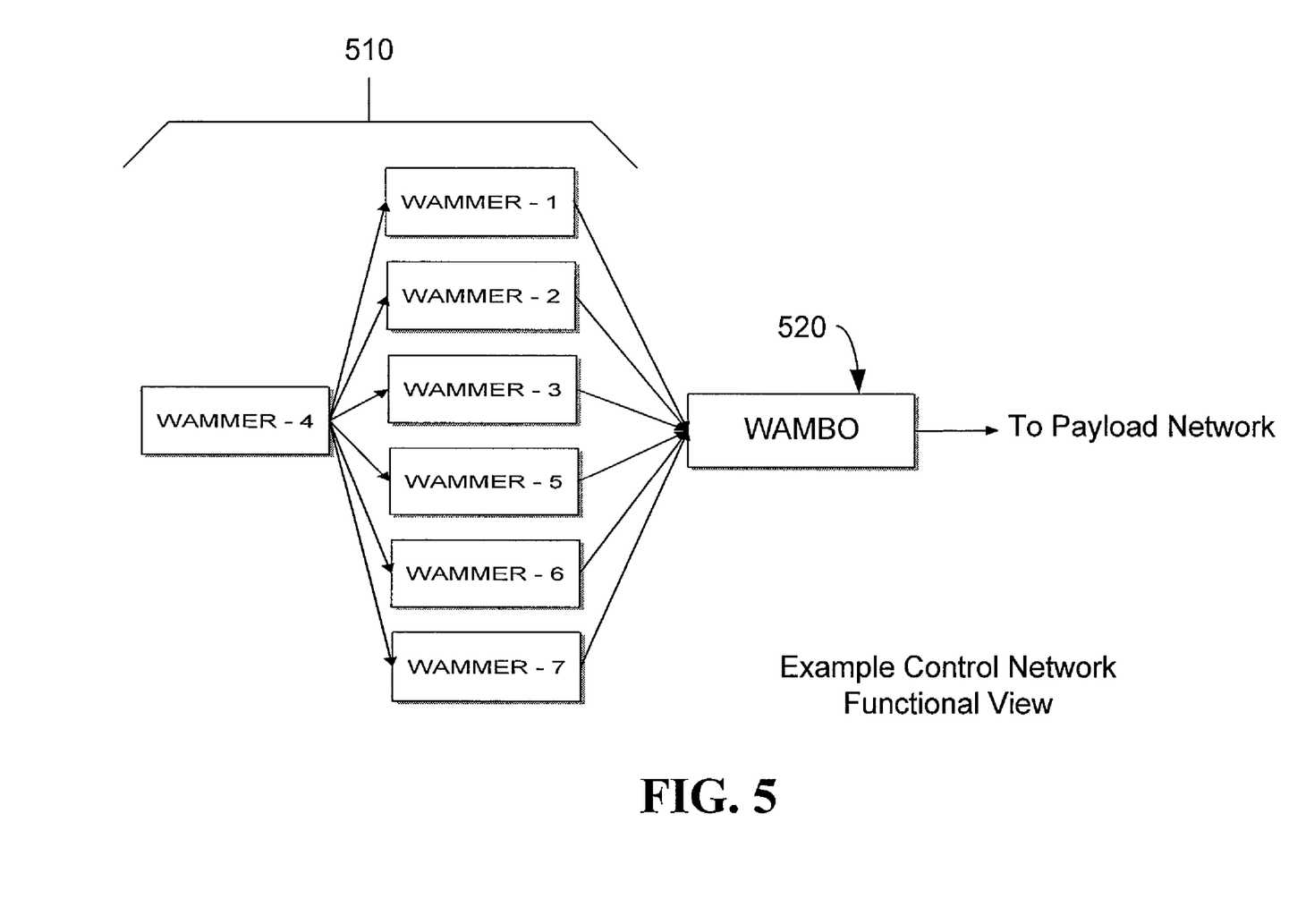
FIG. 5 depicts an example of a control network.

FIG. 5 depicts one embodiment of a control network functional configuration. In this configuration, the WAM participants (WAMMERs) 510 are arranged to so that WAMMERs 1 through 3 and WAMMERs 5 through 7 communicate directly with the WAM Boss Object (WAMBO) 520. WAMMER 4 is configured to communicate to any of the WAMMERs that are directly connected to the WAMBO 520. The WAMBO communicates with a WAN Manager (Not Shown). The WAM Manager may be located in the egress network as the WAN server 432. The WAM Manager is responsible for aggregating the communication of the WAMMERs and conveying the aggregated information to the payload network. The control network likewise works in reverse and routes all aggregation data from the payload network between WAMMERs. It operates in this capacity as a backbone network. In this context, WAMMERs are considered to be network edge components that send and receive information via the payload network to a destination egress.

The state of each WAMMER is known or is available to the entire community 510 in order to provide management information to the WAM Manager. State information would typically include payload bandwidth capability, control bandwidth capability, control network connection quality, payload network connection quality, payload latency, control latency, queuing, prioritization, class of service, quality of service, and the like. State information may be obtained having each WAMMER broadcast the information on the control network or via access through a registration server on the control network. In one embodiment, the registration server for the control network may be a WAM Boss Object (WAMBO) 520. In one embodiment, the WAMBO services the other WAMMERs by holding status information concerning the WAMO community.

A dedicated, or elected registration process can be maintained either locally to the control network or remotely on the egress network. Returning to FIG. 4, the figure depicts a remote server 432 in the egress network. However, both primary and secondary servers can be maintained for higher WAM availability; one locally on the control network and one remotely in the egress network. A registration server residing on the local control network might be a dedicated device or can be provided by a WAMMER with sufficient resources. In such an instance, the WAMMER is configured for either registration server initialization and local broadcast across the control network LAN topology. The WAMO state is maintained in a WAM Register table in the WAMBO.

Network control state of each WAM participant can also be maintained via local broadcast within the control network 410. For small WAMOs this can be effective, as the number of control packets being broadcast should be small. However, as WAMOs grow in size, the overhead from these broadcast packets can introduce control challenges because each WAMMER may attempt to manage the control information for all peer WAMMERs. To address this challenge, a more capable WAMBO Server Unit may be introduced into the control network 410 to mediate control information.

The payload network 420 (PAYNET) of FIG. 4 is generally a wide-area network resource, from and to which bandwidth is aggregated and shared between WAM participants via the control network. The payload network may be heterogeneous. For example, in a five (5) peer WAMO, three of the WAM participants may be using a universal mobile telecommunications system (UMTS) for their payload network connection while the other two may be connected to a wireline ATM network. In addition, while all WAM participants must participate in the control network, a connection to a payload network by all participants is not a requirement. Thus, users without access to a payload network, such as a WAN connection, may still request resources from other WAM participants on the same WAMO. This is shown by example in FIG. 5 as Wammer-4 (510) is not directly connected to the WAMBO in the control network 410.

The payload network 420 (PAYNET) is logically positioned between the control network 410 (CTLNET) and the egress network 430 (EGRNET). As its name implies, the egress network 430 is responsible for combining and regulating each of the aggregation requests and bandwidth flows from WAM participants 510. The egress network 430 is managed by a WAM Server application 432. This application maintains records of all WAMOs being serviced, the state of each WAM participant 510 on a per-WAMO basis, and the merging and forwarding of WAM flows to an external network 440. The external network 440 may be a custom network, or may be an Internet edge router. A egress network 430 can manage one or more WAMOs.

Packet Routing

In the WAM environment, participants join a WAMO in order to achieve access to greater network (payload) resources. In general, this is the result of less than desired wide-area-network connectivity. By joining a WAMO, the WAMMER is then able to request that idle payload network bandwidth (i.e. WAN) among fellow WAMMERs be put to work collectively. Scheduling and sharing rules provide mechanisms for these WAMMERs to send packets across all of the WAMMER's payload network via a multiplexing distribution capability as well as to reverse distribute packets received on one's own payload network to the appropriate WAMMER destination.

As depicted in FIGS. 4 and 5, a WAMO includes a WAM participant (WAMMER) 510, a WAM Boss Object (WAMBO) 520 which is also known as a WAM master, a WAM control network (CTLNET) 410, a WAM payload network (PAYNET) 420, a WAM egress network (EGRNET) 430, and a WAM Manager (WAMMAN) which is also known as a WAM Server 432. WAM-tagged network packets are known as WAMNets.

Figure 6:
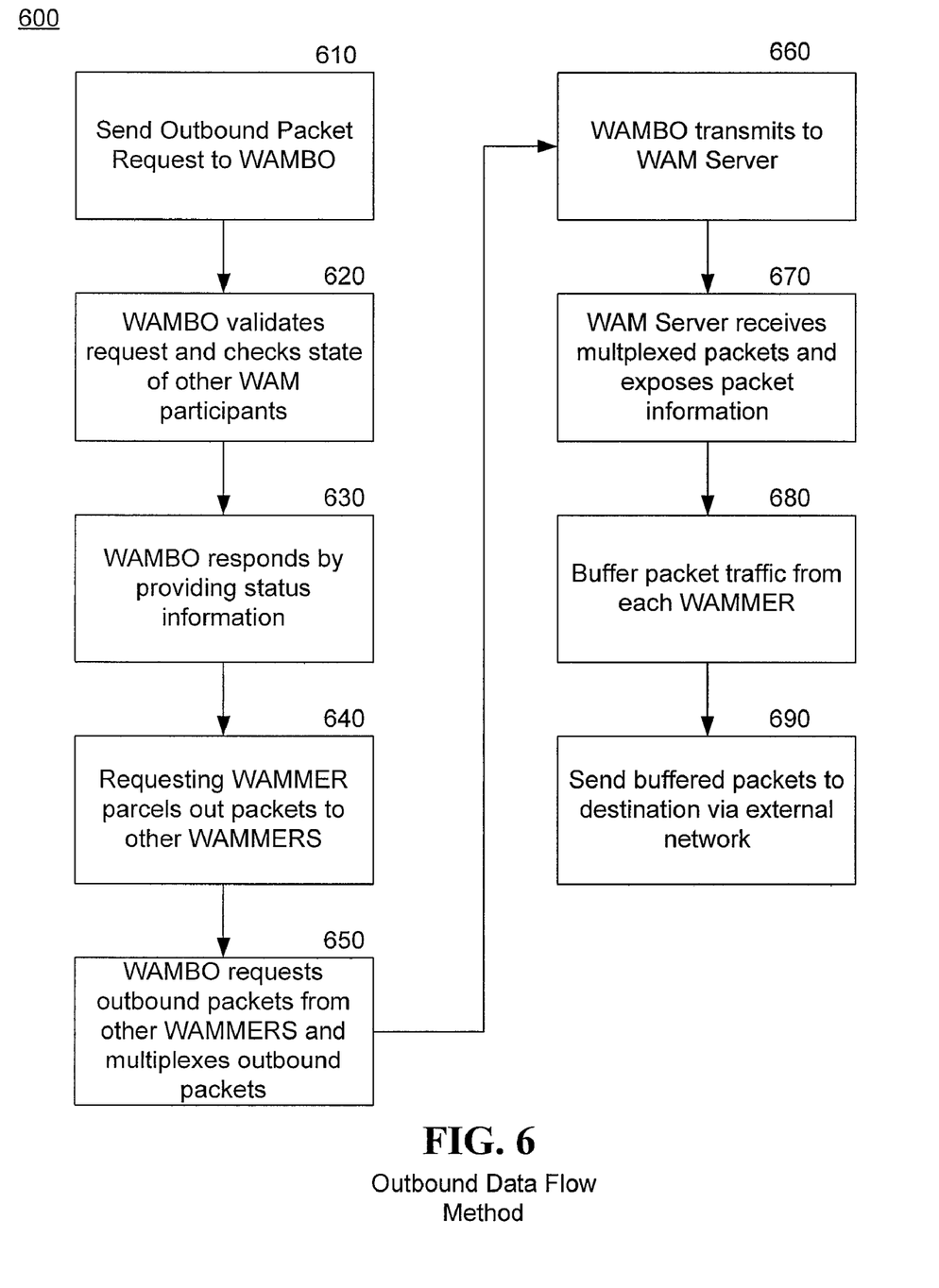
FIG. 6 depicts an example outbound data flow method in accordance with an embodiment of the invention.

To initiate a WAM session, a software application on the WAMMER client 510 initiates a request to an appropriate WAM Server (e.g. 432) to join a WAMO. Based upon authentication credentials, the WAM Server authenticates the request and creates an entry in the active state table (AST) for that WAMO. Other performance and environmental information for that client is also requested and stored in this AST. The WAMO Server creates and sends a message to the client containing the location of the current master (WAM boss object, WAMBO). The WAMO Server also passes a message to the WAMBO with this new participant information. The WAMMER may register in more than one WAMO. The WAMBO may also send a validation message to the newly registered WAMMER to test their connectivity performance. The WAMBO is the coordinator of control network activities for a particular WAMO. It maintains a table of each WAMMER request and WAMMER state in at least one WAM Register. The WAMBO will determine the active state of each WAMMER, determine the queue state (work backlog) for each WAMMER, and determine the performance and capability of each WAMMER Outbound Data Flow With registration complete, a requesting WAMMER can source outbound packets from the WAMBO. An example method 600 of outbound data flow is provided in FIG. 6. The method 600 of FIG. 6 represents a configuration including a WAMBO, similar to that of FIG. 5, is used to coordinate packet traffic. However, a coordination function distributed (distributed WAMBO) among all WAMO participants is also possible. Referring to FIG. 6, initially, an outbound packet request is sent from a requesting WAMMER to the WAMBO at step 610. The request is to send a requesting WAMMER packet through the PAYNET and ERGNET to an external network such as a corporate network or the Internet. Upon receipt of the request, the WAMBO validates the request and checks the WAM Register table to obtain the state of other WAMMERs on the WAMO at step 620. This may be accomplished by reading a an updated WAMMER list from WAMBO registers or files. At step 630, the WAMBO responds to the requesting WAMMER using messaging containing the profiles of each WAMMER in the WAMBO. This table tells the requesting WAMMER who has an ability to send data and for each fellow WAMMER, what part of the load they should share. At step 640, the WAMMER then parcels out (multiplexes) the request in pieces (generally an IP packet) to each WAMMER in the WAMO. These messages are wrapped in a control header that in turn is wrapped by standard UDP and IP headers.

At step 650 the WAMBO requests available outbound packets from other WAMMERS in the WAMBO and multiplexes all of the available outbound packets from the WAMBO. In an alternative embodiment, the WAMBO may coordinate the delivery of packets by accepting all packets from the requesting WAMMER and then provides parcels and the multiplexing function. At step 660, the WAMBO transmits all of the multiplexed packets to the WAM Server. The EGRNET WAM Server receives each of these outbound WAMMER streams and exposes the packet information from each WAMMER. At step 680, traffic from each WAMMER is buffered. This is accomplished by examining the WAM header in the packet to see on whose behalf the packet was sent. It then stores in a buffer for pre-processing (re-sequencing) prior to sending onward (route forwarding).

Figure 7:
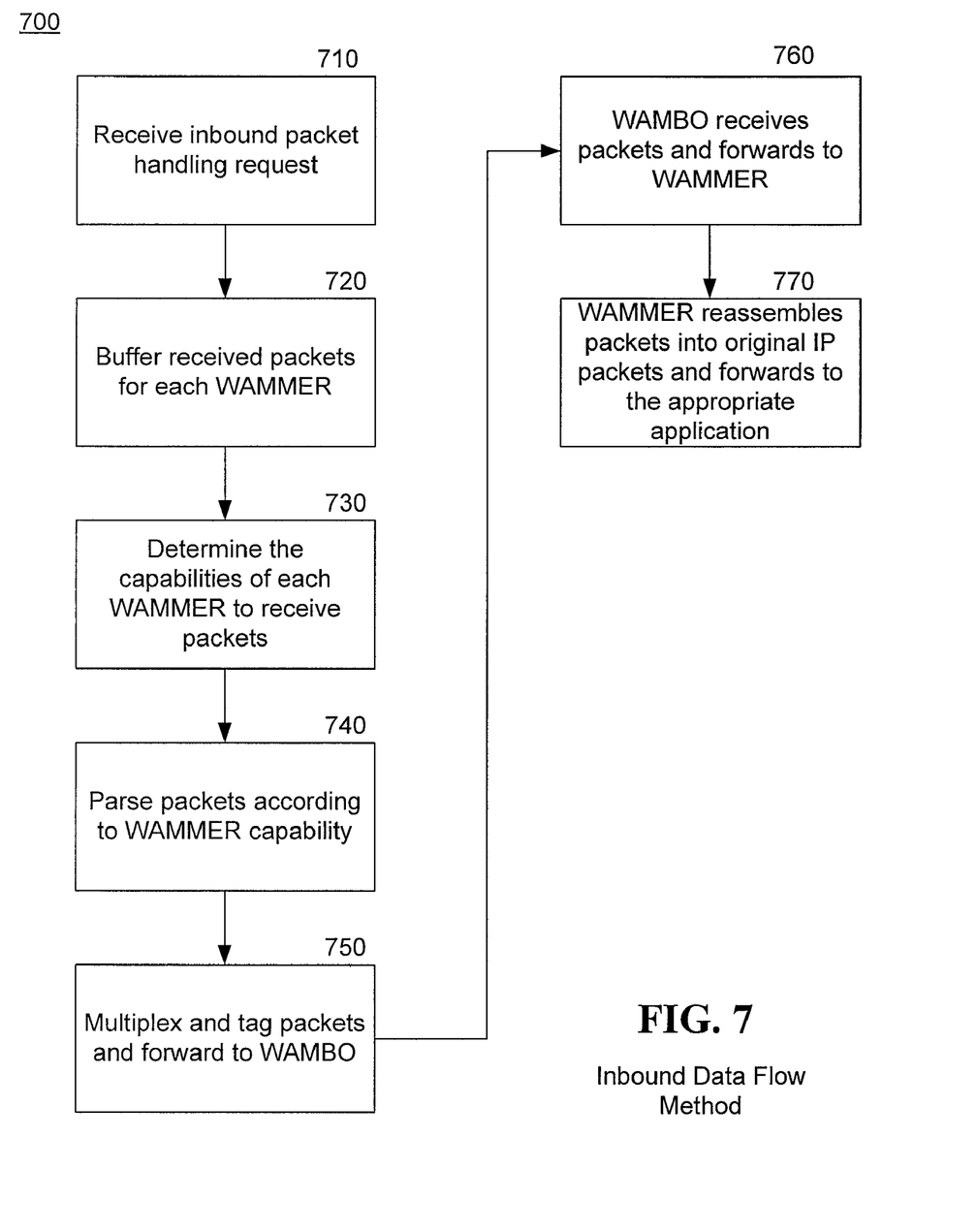
FIG. 7 depicts an example inbound data flow method in accordance with an embodiment of the invention.

Different packet types may be buffered using different techniques. If UDP packet traffic is to be buffered, the packet traffic is buffered in a table/list for each WAMMER until all of the fragments for that UDP sequence are recovered. Often, no fragmentation will occur. Upon complete reception, the packet traffic is ready to be forwarded to its destination. If TCP packet traffic is to be buffered, the TCP traffic is buffered in a table/list for each WAMMER until all of the fragments that the TCP sequence are recovered. It is observed that Windowing may occur here, or the WAM Manager can assume that the next destination will fulfill such function. At step 690, the buffered packets are sent to their destinations via the external Internet or corporate network connected to the egress network Inbound Data Flow An example method 700 concerning inbound data flow is provided in FIG. 7. As in FIG. 6, the method of FIG. 7 assumes a configuration having a WAMBO that coordinates WAMO activities. However, a WAMBO function distributed among all WAMO participants may also be used. Referring to FIG. 7, at step 710, inbound packets from an external Internet or corporate network are received by the WAM server of the egress network. At step 720, the incoming packets are buffered. Different packet types are buffered differently. UDP traffic packets are received and placed into buffers for each WAMMER that is registered to the WAMO. TCP packet traffic is received and placed into buffers for each of the registered WAMMERs in the WAMO. Windowing may occur here or the WAM Server can assume that the next destination will fulfill such function. At step 730, the capabilities of each of the WAMMERS is determined. This is accomplished by querying the WAM Register and WAMMER listing of the WAMBO to ensure that the WAM Server knows the active state off all of the WAMO participants.

Upon receiving state information from the WAMBO, the WAM Application Server will break up (parse) the return payload packets into smaller components at step 740 according to WAMMER capabilities. These parsed components will then be packaged (multiplexed) and distributed to the WAMBO according to their PAYNET connection and current queue/work status and capability at step 740. Additionally, each of these packets are tagged in their header for reassembly within the CTLNET at step 750. The WAMBO receives the WAM packets at step 760 and forwards them across the payload network and arrive at the appropriate WAMMER destination, which is the WAMO participant who is handling the WAM packets on the originator's behalf. Here, the WAMBO introduces the WAM packets to the local control network (CTLNET) for delivery to the appropriate WAMMER. Each WAMMER then re-assembles packets into original IP packets and forwards to the appropriate application associated with the WAMMER at step 770.

In one embodiment, each WAMMER listens to the control network (CTLNET) for requests for work. A request for work received by a WAMMER may be either an outbound or inbound request. In the case of an inbound request, the WAMMER detects a packet with an inbound tag at step 770. The tag component of the WAM header would indicate an inbound message. Upon interrogation of the WAM packet, the real payload will be decapsulated from the WAM packet and placed into the WAMMER's packet pool for sequencing and delivery to the application.

Example Uses

In an embodiment, the WWAN connections associated with the corporate wireless accounts of a company's employees can be bound into a broadband channel that may be used by any one of the employees. For example, as employees arrive at work, their wireless connections are bound to the group aggregate connection and the company's other employees can utilize any excess capacity on the employee's wireless connection. When the employee leaves work, the wireless capacity is unbound from the aggregate and thereafter will be only useable by that particular employee.

In another embodiment, a WAM community may be formed by a group of employees in a satellite office. In this office each employee establishes a WWAN connection and starts the WAM client. The WAM client searches for other active authorized WAM clients or an already established WAM community via a peer-to-peer WLAN, an infrastructure WLAN, or a terrestrial LAN, depending upon the client configuration.

Various possible authorization schemes can allow a subset of users in a single office, any of the employees of a single office, any of the employees of an entire enterprise, or a variety of other collections of employees of an enterprise to form closed WAM communities. When outside the office, with different settings a user may still be allowed to connect to open WAM communities.

In another embodiment in a corporate closed WAM community, the bandwidth from the pool may be allocated to the pool members on an "as-needed" basis, utilizing a predetermined prioritization scheme. One such scheme may be a "first-come, first-served" scheme that assigns bandwidth based on temporal priority. Another such bandwidth allocation scheme may consider the latency and bandwidth sensitivity of the application. For example, a highly sensitive application such as a video conference will get the available bandwidth from the pool before a low priority application, such as a file transfer. Limits may be placed upon prioritization and sharing as well, such as guaranteeing a user at least some percentage of the user's own bandwidth. For instance, each user can be guaranteed to have access to a predetermined portion of the surplus shared bandwidth based upon prioritization.

In yet another embodiment, a closed corporate WAM community offers the opportunity for a variety of additional WAM community formation models beyond the voluntary process described above. In such an embodiment, the binding process may be time-activated rather than location activated, perhaps to reflect normal working hours. For example, the binding process can occur at 8:00 AM and de-binding at 5:00 PM. As another alternative, the binding process may be continuous, provided the employee is registered with the wireless network. In this embodiment, the binding process can be triggered by, or part of, the wireless network access registration process.

In an alternative embodiment, in networks where bandwidth is reserved for a wireless subscriber regardless of whether the subscriber is currently registered with the wireless network, the binding process can occur when the employee is not registered with the wireless network, therefore making the entire employee's channel available for others to use.

In an alternative embodiment, a local or remote registration technique will determine pool group(s), characteristics of members (class of service, quality of service), and participation types (active, inactive, reserved, conditional). For example in an office of an enterprise setting, upon login, a member enters a WAM client pool and is assigned a priority number and its capabilities are identified and are taken into consideration. In another embodiment the history of the activities of a client may also be factored in for assignment of tasks and priority. In yet another embodiment the bandwidth belonging to an unregistered WAM client may be available to the members of a pool until the owner of the bandwidth registers with the system and gains first priority to its bandwidth. In yet another embodiment a high priority peer may be able to unconditionally claim some low priority bandwidths as long as it needs to. The communication in the embodiments utilizing the registration information may be either controlled by dedicated appliances or by one or more of the pool clients which are aware of the priority and assignment rules of the system. In other embodiments, upon registration and identification, the WAM client may be assigned to one of several existing bandwidth pools and with each assignment the client be given a different priority, advantages, responsibilities, etc. In another embodiment a client may be involuntarily removed from a bandwidth pool and be entered in another bandwidth pool. In such embodiments pool member clients may periodically broadcast a measure of their recent activities to enable the master(s) to optimize bandwidth utilization.

While specific circuitry may be employed to implement the above embodiments, aspects of the disclosed embodiments can be implemented in any suitable computing environment. Although not required, aspects of the embodiments may be implemented as computer-readable media having computer-executable instructions, such as routines executed by a general-purpose computer, e.g., a server computer, wireless device or personal computer. The computer-readable media may include magnetic and optical media as well as semiconductor media. Those skilled in the relevant art will appreciate that the aspects can be practiced with other communications, data processing, or computer system configurations, including: Internet appliances, hand-held devices including personal digital assistants (PDAs), wearable computers, all manner of cellular or mobile phones, multi-processor systems, microprocessor-based or programmable consumer electronics, set-top boxes, network PCs (personal computers), minicomputers, mainframe computers, and the like. Indeed, the terms "computer," "client," and similar terms are generally used interchangeably herein, and refer to any of the above devices and systems, as well as any data processor.

Some aspects of the embodiments can be implemented in a special purpose computer or data processor that is specifically programmed, configured, or constructed to perform one or more of the processes explained in detail herein, such as if the dedicated appliance 309 of FIG. 3A is employed.

Aspects of the disclosed embodiments can be implemented in the form of methods and apparatuses for practicing those methods or in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing different aspects of the invention. These aspects can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing different aspects of the invention.

Unless the context clearly requires otherwise, throughout this document, the words "comprise", "comprising", "including" and the like are to be construed in an inclusive sense as opposed to an exclusive or exhaustive sense; that is to say, in the sense of "including, but not limited to". Additionally, the words "herein," "above" and "below" and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number respectively.

The teachings of the invention provided herein can be applied to other systems, not necessarily the system described herein. The elements and acts of the various embodiments described above can be combined to provide further embodiments. Any referenced patent and/or patent application or any other reference, including any that may be listed in accompanying filing papers are incorporated herein by reference. Aspects of the invention can be modified, if necessary, to employ the systems, functions, and concepts of the various references that may have been described herein to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein. Particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

While certain aspects of the invention are presented below in certain claim forms, the inventors contemplate the various aspects in the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. A method of dynamic bandwidth allocation among a plurality of wireless device clients of a wireless wide-area network (WWAN), wherein the clients are within wireless signal reception of each other, and wherein each client has an allocated bandwidth for communicating over the WWAN, the method comprising:

forming a pool of at least two clients wherein an unused portion of a client bandwidth is available for sharing by at least one client in the pool;

identifying a communication manager to manage traffic between the pool clients and the WWAN, wherein each client has access, if needed, to a entire client's own allocated bandwidth, wherein each client has access to at least a portion of other clients' unused bandwidths, and wherein the communication manager controls sharing of unutilized bandwidths and flow of data by identifying clients of the pool with excess bandwidth and choosing at least some identified clients of the pool to participate in the communication process; and in an instance of transmission, the communication manager receives data from a data transmitting client of the pool, prepares the received data for distribution among pool clients chosen for reception, and distributes the prepared data among the chosen pool clients for transmission over the WWAN; and in an instance of reception, the communication manager obtains data portions received by clients chosen for reception from the WWAN, assembles obtained data for transmission to a destination pool client, and transmits assembled data to the destination pool client.

2. The method of claim 1, wherein identifying a communication manager to manage traffic between the pool clients and the WWAN comprises identifying one of the pool clients as the communication manager selected to manage communication traffic between the pool clients and the WWAN.

3. The method of claim 1, wherein identifying a communication manager to manage traffic between the pool clients and the WWAN comprises identifying a dedicated appliance as the communication manager selected to manage communication traffic between the pool clients and the WWAN.

4. The method of claim 1, wherein identifying a communication manager to manage traffic between the pool clients and the WWAN comprises identifying at least a subset of the pool clients as the communication manager to participate in managing communication traffic between the pool clients and the WWAN.

5. The method of claim 1, wherein the WWAN employs wireless technology that is cellular, wireless LAN, or short-range radio frequency (RF).

6. The method of claim 1, wherein the pool of clients form a WiFi hotspot.

7. The method of claim 1, wherein the WWAN employs GPRS (General Packet Radio Service), EDGE (Enhanced Data rates for Global Evolution), 1xRTT (Single Carrier (1x) Radio Transmission Technology), EVDO (Evolution Data Only, Evolution Data Optimized), or UMTS (Universal Mobile Telecommunications System) cellular wireless technology.

8. The method of claim 1, wherein the pool is a peer-to-peer wireless LAN, an infrastructure wireless LAN, or a terrestrial LAN.

9. The method of claim 1, wherein pool clients are connected via any combination of wired, fiber, or wireless infrastructures.

10. The method of claim 9, wherein pool clients connections employ LAN/MAN/WAN, WiFi, infrared, Bluetooth, Ultrawideband, or WiMax technologies in any combination of ad-hoc, peer-to-peer, or access point (control point) configurations.

11. The method of claim 1, wherein the pool clients are coupled via WiFi, infrared, Bluetooth, Ultrawideband, or WiMax protocols.

12. The method of claim 1, wherein an authorization scheme allows a subset of users in a single office of an enterprise, any employee of the single office, any employee of the enterprise, or any combination thereof, to form a closed pool.

13. The method of claim 1, wherein joining a pool is voluntary or mandatory at least during predetermined times, and wherein either all pool clients have similar transmission, reception, or both priorities, or pool clients have differing priorities.

14. The method of claim 10, wherein client priority is based on first come first served, application priority, time limits, or organizational rank of a pool client.

15. The method of claim 1, wherein a local or remote registration scheme determines pool group(s) and associated available pool client services, client priorities of transmission and reception, client limitations, or a combination thereof.

16. The method of claim 1, wherein an allocated bandwidth is available in the pool if a bandwidth owner is logged off.

17. A system configured to be a wireless wide-area network (WWAN) wireless that functions to share transmission bandwidth with WWAN device clients, the system comprising:

a plurality of clients, the clients forming a wireless pool of available client bandwidth for the transmission of data;

a wireless pool boss object device for coordinating packet traffic from the clients of the pool and checking the status of the plurality of clients to identify unused bandwidth for each of the plurality of clients; and a wireless aggregation server for receiving packets from the wireless pool boss object device;

wherein a first pool client requests a transmission of data via a message sent to the wireless object device, the wireless boss object device responding by providing a status of other clients in the pool and associated unused bandwidth that is useful to transmit the data, the first client parceling out packets of the data to be transmitted by the other clients in the pool using the unused bandwidth, the wireless boss object device requesting and receiving packets of the data to be transmitted from the other clients via the unused bandwidth, the wireless boss object device sending the packets of the data to the wireless aggregation server, wherein the server transmits the data to an external network.

18. The system of claim 17, wherein the wireless aggregation server exposes packet information from each packet containing the data and resequences the packets before transmitting the data to the external network.

19. A system configured to be a wireless wide-area network (WWAN) wireless that functions to share reception bandwidth with WWAN device clients, the system comprising:
   a plurality of clients, the clients forming a wireless pool of available client bandwidth for the reception of data;
   a wireless pool boss object device for coordinating packet traffic to the clients of the pool and checking the status of the plurality of clients to identify unused bandwidth for each of the plurality of clients; and
   a wireless aggregation server for receiving packets inbound to the wireless pool;
   wherein the inbound packets are received and buffered by the wireless aggregation server, the wireless pool boss object device provides to the wireless aggregation server bandwidth sharing capability information of the plurality of clients, the wireless aggregation server organizes the buffered packets into smaller components, each smaller component tagged for a respective client in the wireless pool, the smaller components transmitted to the wireless pool boss object device, each respective client of the wireless pool receiving the smaller components from the wireless pool boss object device, each respective wireless pool client reassembling the smaller components into original internet protocol (IP) packets.

20. The system of claim 19, wherein after reassembling the smaller components into original IP packets, each wireless pool client forwards the IP packets to a client-based application for processing.

* * * * *